(12) United States Patent
Moghtadai

(10) Patent No.: US 11,430,242 B2
(45) Date of Patent: *Aug. 30, 2022

(54) SYSTEMS AND METHODS FOR OBTAINING PRODUCT INFORMATION IN REAL-TIME

(71) Applicant: The Toronto-Dominion Bank, Toronto (CA)

(72) Inventor: Mehran Moghtadai, Dollard-des-Ormeaux (CA)

(73) Assignee: The Toronto-Dominion Bank, Toronto (CA)

(*) Notice: Subject to any disclaimer, the term of this patent is extended or adjusted under 35 U.S.C. 154(b) by 85 days.

This patent is subject to a terminal disclaimer.

(21) Appl. No.: 17/064,649

(22) Filed: Oct. 7, 2020

(65) Prior Publication Data
US 2021/0019514 A1 Jan. 21, 2021

Related U.S. Application Data

(63) Continuation of application No. 16/138,194, filed on Sep. 21, 2018, now Pat. No. 10,832,047.

(51) Int. Cl.
| | |
|---|---|
| *G06V 30/414* | (2022.01) |
| *G06Q 40/08* | (2012.01) |
| *G06Q 30/02* | (2012.01) |
| *G06V 30/413* | (2022.01) |
| *G06V 30/10* | (2022.01) |

(52) U.S. Cl.
CPC ....... *G06V 30/414* (2022.01); *G06Q 30/0206* (2013.01); *G06Q 40/08* (2013.01); *G06V 30/413* (2022.01); *G06V 30/10* (2022.01)

(58) Field of Classification Search
CPC .... G06V 30/414; G06V 30/413; G06V 30/10; G06V 20/63; G06Q 30/0206; G06Q 40/08
USPC ......................................................... 382/176
See application file for complete search history.

(56) References Cited

U.S. PATENT DOCUMENTS

| | | | |
|---|---|---|---|
| 8,543,478 B2 | 9/2013 | Leistner | |
| 8,595,115 B2 | 11/2013 | Leistner | |
| 9,652,805 B1 | 5/2017 | Clawson, II et al. | |
| 9,916,625 B2 | 3/2018 | Lehman et al. | |
| 2002/0029232 A1* | 3/2002 | Bobrow | G06V 30/418 514/534 |
| 2008/0183552 A1 | 7/2008 | O'Hagan | |
| 2009/0083120 A1 | 3/2009 | Strichman et al. | |

(Continued)

*Primary Examiner* — Jerome Grant, II
(74) *Attorney, Agent, or Firm* — Rowand LLP

(57) ABSTRACT

A processor-implemented method is disclosed. The method includes: receiving, from a first client device, a signal representing image data depicting at least one first document containing a product specification for a first product; performing text recognition on the image data to identify text in the at least one first document; determining at least one first value associated with the first product based on the recognized text; identifying a second product based on determining that product specification for the second product satisfies one or more predetermined criteria relating to the at least one first value; determining at least one second value associated with the second product; generating first display data including a graphical representation of the at least one second value; and transmitting, to the first client device via a communications module, a signal representing the first display data.

20 Claims, 7 Drawing Sheets

(56) References Cited

U.S. PATENT DOCUMENTS

| | | |
|---|---|---|
| 2011/0171938 A1 | 7/2011 | Daugherty et al. |
| 2011/0295623 A1* | 12/2011 | Behringer .............. G06Q 40/08 |
| | | 704/235 |
| 2013/0290036 A1 | 10/2013 | Strange |
| 2014/0142987 A1 | 5/2014 | Misch et al. |
| 2014/0143096 A1 | 5/2014 | Stubert et al. |
| 2014/0379484 A1 | 12/2014 | Duponchel et al. |
| 2015/0213498 A1 | 7/2015 | Ito |
| 2015/0379341 A1* | 12/2015 | Agrawal .............. G06V 30/414 |
| | | 382/176 |
| 2018/0174220 A1 | 6/2018 | Jadhav et al. |
| 2019/0121840 A1* | 4/2019 | Abbott ................ G06Q 10/103 |
| 2019/0370541 A1* | 12/2019 | Guzman ............. G06V 30/147 |
| 2019/0378215 A1* | 12/2019 | Yelovitch ............... G06Q 40/08 |
| 2020/0160050 A1* | 5/2020 | Bhotika ............... G06V 30/414 |
| 2022/0036465 A1* | 2/2022 | Fields ................... G06Q 40/08 |

* cited by examiner

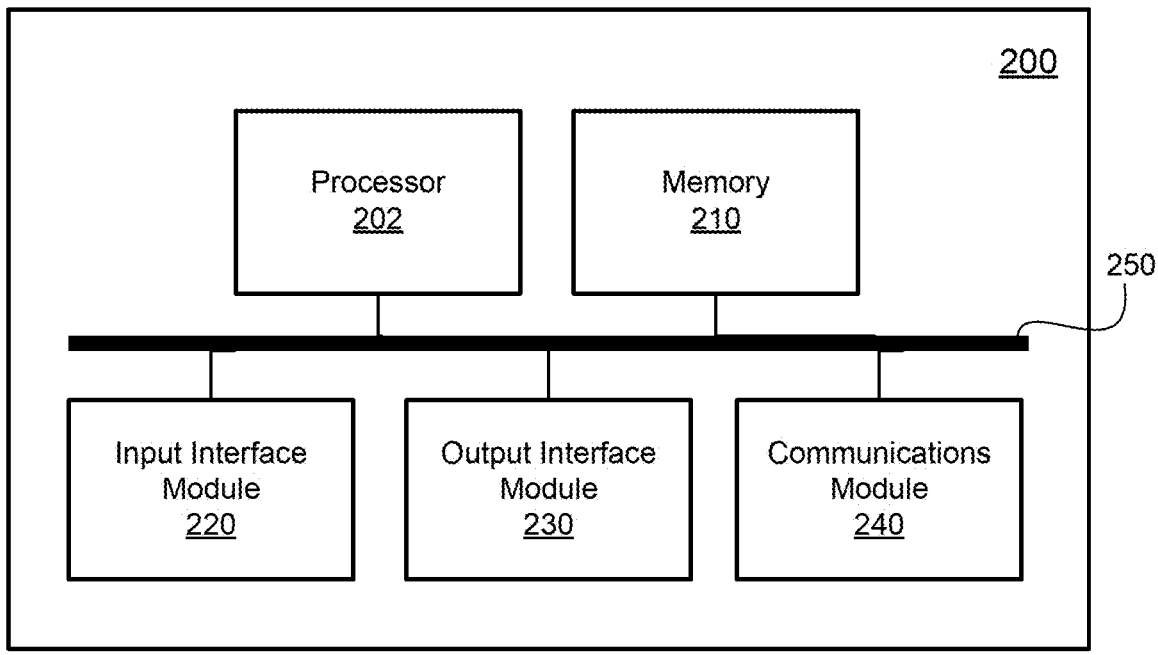
FIG. 2
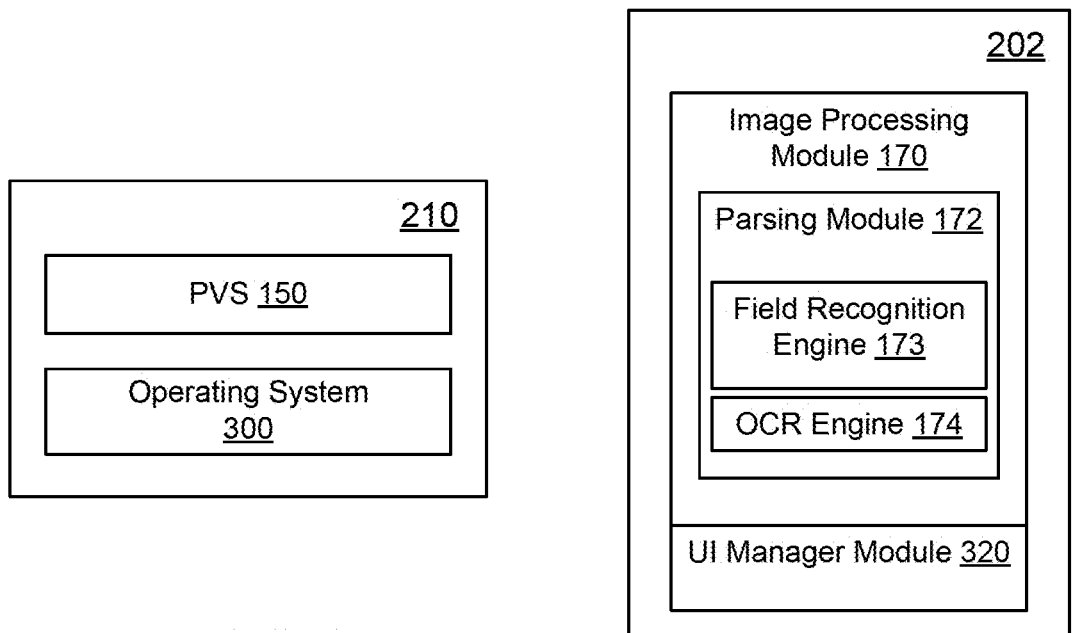
FIG. 3A
FIG. 3B

SYSTEMS AND METHODS FOR OBTAINING PRODUCT INFORMATION IN REAL-TIME

CROSS-REFERENCE TO RELATED APPLICATION

This application claims priority to U.S. patent application Ser. No. 16/138,194 filed on Sep. 21, 2018, the entirety of which is incorporated herein by reference.

TECHNICAL FIELD

The present disclosure relates to data processing systems and, more particularly, to systems and methods for obtaining client-specific product information and automatically performing comparisons of related products in real-time.

BACKGROUND

Documents containing product details/specification are often lengthy and may be overly complicated for a typical customer to understand. A product's specification may include technical jargon and/or industry-specific principles with which customers may not be familiar. Product details that are of particular interest for customers may sometimes be obscured by non-essential information. The process of manually reviewing product specification documents and distilling relevant information can be onerous for customers and prospective buyers. As a consequence, customers may fail to adequately review such documents.

This difficulty in processing product specification documents is especially pronounced for customers who wish to compare similar products based, at least in part, on their respective specifications. For example, policy documents, such as insurance policy documents, can be complex, making it difficult for ordinary customers to understand and appreciate details of the policy. Given limited knowledge of a product, the prospects of a customer being able to (1) identify similar products (e.g. products having similar specification) in an expedient manner, and (2) compare the products comprehensively in order to determine which of the products they prefer, is likely to be poor.

Accordingly, it would be desirable to provide a system that facilitates real-time acquisition of product data and presentation of the data to consumers, in a manner that can reduce the likelihood of human error or oversight in processing product information.

BRIEF DESCRIPTION OF DRAWINGS

Reference will now be made, by way of example, to the accompanying drawings which show example embodiments of the present application and in which:

FIG. 2 is a high-level operation diagram of an example computing system for implementing example embodiments of a product valuation system;

FIG. 3A depicts a simplified organization of software components stored in an exemplary memory of the example computing system of FIG. 2.

FIG. 3B depicts a simplified organization of components in an exemplary processor of the example computing system of FIG. 2;

Like reference numerals are used in the drawings to denote like elements and features.

DETAILED DESCRIPTION OF EXAMPLE EMBODIMENTS

Figure 1:
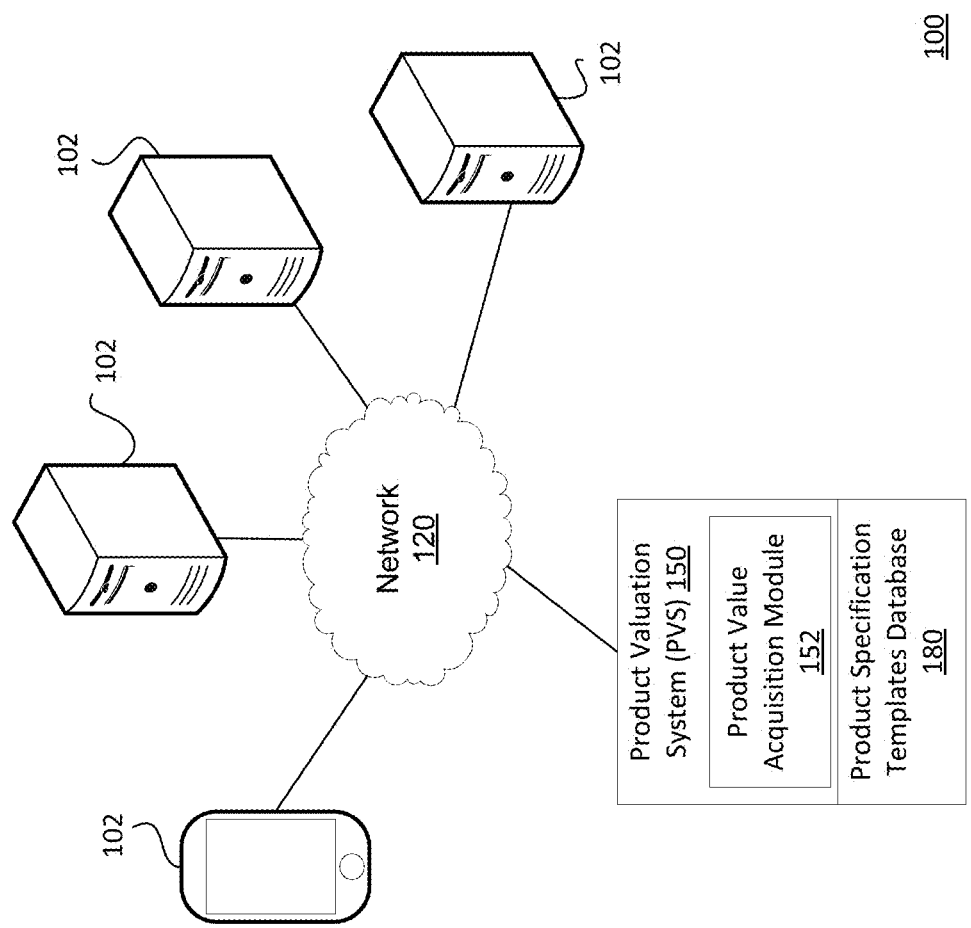
FIG. 1 is a schematic diagram illustrating an operating environment of an example embodiment.

In an aspect, the present disclosure describes a computing system. The computing system includes a memory, a communications module that is communicable with an external network, and a processor coupled to the memory and the communications module. The processor is configured to: receive, from a first client device, a signal representing image data depicting at least one first document containing a product specification for a first product; perform text recognition on the image data to identify text in the at least one first document; obtain a first value representing the product specification for the first product based on the recognized text; select a second product having a product specification represented by the first value; obtain a second value associated with the selected second product; generate first display data including a graphical representation of the second value; and transmit, to the first client device via the communications module, a signal representing the first display data.

In some implementations, the processor may be further configured to receive, from the first client device, contextual data that defines a current status of the first client device. The first value representing the product specification for the first product may be obtained based on the recognized text and the contextual data.

In some implementations, the contextual data may comprise at least one of: geolocation data; temperature data; motion data; altitude data; and proximity data indicating proximity to one or more known devices.

In some implementations, performing text recognition on the image data may include: comparing the image data depicting the at least one first document to one or more document templates from a first database, the one or more document templates containing product specifications for a first set of products; and determining that there is a match between the at least one first document and a first one of the document templates from the first database.

In some implementations, performing text recognition on the image data may include applying optical character recognition (OCR) on the image data.

In some implementations, the processor may be further configured to: determine that the recognized text does not contain text associated with at least one first predetermined data field; generate second display data for prompting a user of the first client device to provide information relating to the at least one first predetermined data field; and transmit, to the first client device, the second display data.

In some implementations, the second display data may include a graphical user interface including a fillable input form containing the at least one first predetermined field. In some implementations, the second display data may include a graphical user interface including an application form having the at least one first predetermined field highlighted.

In some implementations, selecting the second product may include determining that product specification for the second product satisfies a predefined condition associated with a predetermined data field.

In another aspect, the present disclosure describes a method for obtaining an estimate of a value of a product. The method may include: receiving, from a first client device, a signal representing image data depicting at least one first document containing a product specification for a first product; performing text recognition on the image data to identify text in the at least one first document; obtaining a first value representing the product specification for the first product based on the recognized text; selecting a second product having a product specification represented by the first value; obtaining a second value associated with the selected second product; generating first display data including a graphical representation of the second value; and transmitting, to the first client device via the communications module, a signal representing the first display data.

In yet another aspect, the present disclosure may describe an electronic device. The electronic device may include a camera, a display interface, a communications module communicable with an external network, a memory, and a processor that is coupled to the camera, the display interface, the communications module, and the memory. The processor may be configured to: obtain image data depicting at least one first document containing a product specification for a first product; perform text recognition on the image data; generate first display data including a graphical user interface for requesting cancellation of the first product, the graphical user interface being pre-populated with data based on the recognized text; and present the first display data on the display interface.

In yet another aspect, the present disclosure describes a computing system. The computing system includes a communications module communicable with an external network, a memory, and a processor coupled to the communications module and the memory. The processor is configured to: receive, from a first client device, a signal representing image data depicting at least one first document containing a product specification for a first product; perform text recognition on the image data to identify text in the at least one first document; determine at least one first value associated with the first product based on the recognized text; identify a second product based on determining that product specification for the second product satisfies one or more predetermined criteria relating to the at least one first value; determine at least one second value associated with the second product; generate first display data including a graphical representation of the at least one second value; and transmit, to the first client device via the communications module, a signal representing the first display data.

In some implementations, the processor may be further configured to receive, from the first client device, contextual data that defines a current status of the first client device, and the at least one first value may be determined based on the recognized text and the contextual data.

In some implementations, the contextual data may include at least one of: geolocation data; temperature data; motion data; altitude data; or proximity data indicating proximity to one or more known devices.

In some implementations, performing text recognition on the image data may include: comparing the image data depicting the at least one first document to one or more document templates from a first database, the one or more document templates containing product specifications for a first set of products; and determining that there is a match between the at least one first document and a first one of the document templates from the first database.

In some implementations, performing text recognition on the image data may include applying optical character recognition on the image data.

In some implementations, the processor may be further configured to: determine that the recognized text does not contain text associated with at least one first predetermined data field; generate second display data for prompting a user of the first client device to provide information relating to the at least one first predetermined data field; and transmit, to the first client device, the second display data.

In some implementations, the second display data may comprise a graphical user interface including a fillable input form containing the at least one first predetermined field.

In some implementations, the second display data may comprise a graphical user interface including an application form having the at least one first predetermined field highlighted.

In some implementations, identifying the second product may include determining that product specification for the second product satisfies a predefined condition associated with one or more predetermined data fields.

In some implementations, generating the first display data may include generating display data that includes a graphical representation of product comparison data for the first and second products.

In yet another aspect, the present disclosure describes a processor-implemented method. The method includes: receiving, from a first client device, a signal representing image data depicting at least one first document containing a product specification for a first product; performing text recognition on the image data to identify text in the at least one first document; determining at least one first value associated with the first product based on the recognized text; identifying a second product based on determining that product specification for the second product satisfies one or more predetermined criteria relating to the at least one first value; determining at least one second value associated with the second product; generating first display data including a graphical representation of the at least one second value; and transmitting, to the first client device via a communications module, a signal representing the first display data.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "product specification" may interchangeably refer to descriptive information relating to a product and documents that provide descriptions of the product. For example, product specification for a policy product may refer to policy details and requirements and/or copies (e.g. digital, physical) of documents that contain details of the policy.

For the ordinary consumer, comparing multiple products to determine a preferred product can often be a frustrating process. This is especially true of situations where the products being compared are relatively complex in character (e.g. insurance policies). In particular, it may be difficult for a customer to identify products that have the same or similar product specifications, such that a suitable comparison can be made. Generally, a customer will gather product information for a first product and query one or more databases containing product data for various products, in order to identify suitably related products. Obtaining product information can be a complicated and tedious exercise. Customers may be required to review product specifications in great detail and identify relevant data fields that can be used in product database queries. Errors and inaccuracies in the obtained product information for a product may adversely affect the identification of related products and, consequently, distort the product comparisons process.

In an aspect, the present application discloses a system for acquiring product information for a first product and identifying products that are suitably related to the first product for a particular client or customer. More specifically, a system for obtaining product data from a client device and providing recommendations of related products to the client is disclosed. The system of the present disclosure is designed to enable real-time acquisition of product data, retrieval of product details for related products for a particular client, and comparison of product details for two or more different products. In accordance with embodiments of the present disclosure, a computing system receives, from a client device, acquired product data for a specific product. The computing system processes the received data to obtain a first value representing the product specification for the product. A second, related product is automatically selected for the client, based on the product specification. The computing system may then perform comparisons of the related products according to one or more criteria. The comparison data may be provided in various forms to users associated with the client device.

In a further aspect, the present disclosure describes techniques of displaying product comparison data on an electronic device. The comparison data is based on a real-time comparison of two or more related products for a client. The product comparison is preceded by identification of product details for a first product associated with a client, and selection of a related product having the same or similar product specification as the first product. The product details for the first product may be collected from one or more different data sources. In particular, product data may be received from a client device associated with the client. For example, the product data may include image data depicting a product specification associated with the first product. Auxiliary data (e.g. contextual data) received from the client device may inform the identification and, subsequently, comparison of related products. The product comparison data may then be provided in a suitable form to a client associated with the client device. For example, a user interface which graphically represents the product comparison data may be transmitted to the client device for display thereon.

In a further aspect, the present disclosure describes systems and methods for a client device to automatically request cancellation of a product. The product may, for example, be a product that the client had purchased, subscribed to, etc. Product data acquired by the client device is used to automatically generate a request to cancel the product (e.g. end a subscription, notify of termination, return a digital product, request a refund, etc.). The request may then be transmitted to one or more computing systems associated with administering the product.

Reference is first made to FIG. 1, which shows an exemplary operating environment 100 in accordance with embodiments of the present disclosure. FIG. 1 illustrates an exemplary product valuation system (PVS) 150. The PVS 150 may implement processes for, among others, obtaining product-related data depicting a product's specification, identifying text in the product specification, selecting one or more related products having a particular product specification, obtaining values associated with the identified related products, generating display data representing comparison of said values for the products, and distributing the display data to one or more client devices.

The environment 100 includes a plurality of electronic devices 102. Each electronic device 102 is a computer system. An electronic device 102 may be associated with an entity that obtains product-related data for a first product and requests comparison of the first product with a suitably related second product. Such entity may be a consumer, a business, a system owner/administrator, or other parties desirous of requesting product comparisons data for related products.

In some embodiments, the electronic device 102 may be a portable electronic device. For example, the electronic device 102 may, as illustrated, be a smartphone. The electronic device 102 may be a computing system of another type such as a personal computer, a laptop computer, a tablet computer, a notebook computer, a hand-held computer, a personal digital assistant, a portable navigation device, a mobile phone, a smart phone, a wearable computing system (e.g., a smart watch, a wearable activity monitor, wearable smart jewelry, and glasses and other optical devices that include optical head-mounted displays), an embedded computing system (e.g., in communication with a smart textile or electronic fabric), and any other type of computing system that may be configured to store data and software instructions, and execute software instructions to perform operations consistent with disclosed embodiments. In some embodiments, the electronic device 102 may include a smart card, chip card, integrated circuit card (ICC), and/or other card having an embedded integrated circuit.

The electronic device 102 is configured to execute software, such as a products comparison application (not shown). A products comparison application may, for example, be a web application (e.g. single-page application, or SPA), a mobile application, or a desktop application. In some embodiments, the products comparison application may be implemented as a component or feature of another application, such as a mobile banking or payment app. The products comparison application may be an application that can be used by a client to request to receive product information for various products and product comparison data for two or more different products. For example, the products comparison application may be used to retrieve information for products that are related to a user-selected product. As another example, a user may obtain product comparison data for two or more different but related products upon making a request using the products comparison application. In some embodiments, the products comparison application may comprise a Web browser application that is configured to run and display a Web form interface for clients to use when requesting product comparison data.

The network 120 is a computer network. The network 120 allows computer systems in communication therewith to communicate. For example, as illustrated, the network 120 may allow the electronic devices 102 to communicate with the PVS 150 and a product specification templates database 180.

The product valuation system (PVS) 150 is implemented as part of a computer system. The PVS 150 may be implemented by one or more computing systems such as, for example, database servers, computer servers, and the like. For example, the PVS 150 may be implemented by servers that are connected to or integrated with resources accessible by a plurality of computing systems. As another example, the PVS 150 may be implemented by servers associated with a financial institution (e.g. bank, credit union, etc.) interfacing with devices associated with current and/or prospective customers of the financial institution. The computing systems may be in communication with each other using the network 120. Alternatively, the computing systems may communicate using another network such as, for example, a local-area network (LAN). In some embodiments, the PVS 150 may be implemented by multiple computing systems organized in a tiered arrangement (e.g. middle-tier and back-end computing systems). In some embodiments, the PVS 150 may be provided by a cluster formed of a plurality of interoperating computing systems.

The PVS 150 may, in association with one or more different computer systems, handle various services relating to, among others, product information and comparison data request processing, image data analysis, product data retrieval and processing, customer accounts data management, and control of user interfaces for requesting and accessing products information and product comparison data. FIG. 1 illustrates a product value acquisition module 152 which may be included as part of a computer system implementing the PVS 150. The product value acquisition module 152 may be integrated into the PVS 150 or it may be provided by a remote computing unit that is communicably coupled to the computer system administering the PVS 150.

The product value acquisition module 152 processes input data relating to products and generates values associated with the products. A "value" associated with a product may be any property of a product that can be quantitatively or qualitatively described including, for example, monetary value, type, function, appearance, term/duration, etc. The product value acquisition module 152 may acquire product-related data for a product and apply the data as inputs to a mechanism for deriving a value associated with the product. For example, the product value acquisition module 152 may implement one or more suitable algorithms for a product, using the acquired product data as inputs, to generate a value for the product.

The product specification templates (PST) database 180 may contain one or more templates of product specifications for various different products. In at least some embodiments, the PST database 180 may store templates of specifications for products that are offered by different providers. The templates in the PST database 180 may be categorized according to one or more criteria, such as product type, product line, and manufacturer/provider, etc. The PST database 180 may be updated (for example, by a database administrator, product manufacturer, etc.) by adding new or revised specifications or by deleting void or outdated specifications. The PST database 180 may be accessible by at least the PVS 150. Specifically, the PST database 180 may be integrated into the PVS 150 or communicably connected to the PVS 150 via, for example, the network 120.

FIG. 2 is a high-level operation diagram of an example computing system 200 that may be configured to implement a PVS 150. The computing system 200 of FIG. 2 includes a variety of modules. For example, as illustrated, the computing system 200 may include a processor 202, a memory 210, an input interface module 220, an output interface module 230, and a communications module 240. As illustrated, the foregoing example modules of the computing system 200 are in communication over a bus 250.

The processor 202 is a hardware processor. Processor 202 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 102.

The input interface module 220 allows the computing system 200 to receive input signals. Input signals may, for example, correspond to input received from a user. The input interface module 220 may serve to interconnect the computing system 200 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the computing system 200 to provide output signals. Some output signals may, for example allow provision of output to a user. The output interface module 230 may serve to interconnect the computing system 200 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the computing system 200 to communicate with other electronic devices and/or various communications networks. For example, the communications module 240 may allow the computing system 200 to send or receive communications signals. Communications signals may be sent or received according to one or more protocols or according to one or more standards. For example, the communications module 240 may allow the computing system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the computing system 200 to communicate using near-field communication (NFC), via Wi-Fi™, using Bluetooth™ or via some combination of one or more networks or protocols.

Contactless payments may be made using NFC. In some embodiments, all or a portion of the communications module 240 may be integrated into a component of the computing system 200. For example, the communications module may be integrated into a communications chipset.

Software comprising instructions is executed by the processor 202 from a computer-readable medium. For example, software may be loaded into random-access memory from persistent storage of memory 210. Additionally or alternatively, instructions may be executed by the processor 202 directly from read-only memory of memory 210.

FIG. 3A depicts a simplified organization of software components stored in memory 210 of the computing system 200. As illustrated, these software components include an operating system 300 and PVS 150.

The operating system 300 is software. The operating system 300 allows the PVS 150 to access the processor 202, the memory 210, the input interface module 220, the output interface module 230 and the communications module 240. The operating system 300 may be, for example, Apple iOS™, Google™ Android™, Linux™, Microsoft™ Windows™, or the like.

FIG. 3B depicts a simplified organization of components exemplary of an embodiment of the processor 202. As illustrated, the processor 202 includes an image processing module 170 and a user interface (UI) manager module 320. The UI manager 320 manages information that may be displayed on a client device when a user makes a manual request to obtain product information for a user-selected product or products comparison data for two or more products. When a user requests to access product information or products comparison data, it is desirable to display information about the request that is specifically tailored for that user. For example, a requester may wish to view, via the user interface, information regarding the products being compared, such as product type, comparable features and properties, product data and statistics, manufacturer/provider, relative pricing, etc. The UI manager 320 may generate a user interface which can be displayed on the device of a requester, such that the requester can make a manual request (for product information and/or products comparison data) to a product assessment platform such as PVS 150, using the user interface. In particular, the UI manager 320 may determine display data that should be rendered for a requesting user's device.

The image processing module 170 includes, at least, a parsing module 172, which contains a field recognition engine 173 and an OCR engine 174. Each of these components and their respective functions will be discussed in turn with reference to the method 400 in FIG. 4.

Figure 4:
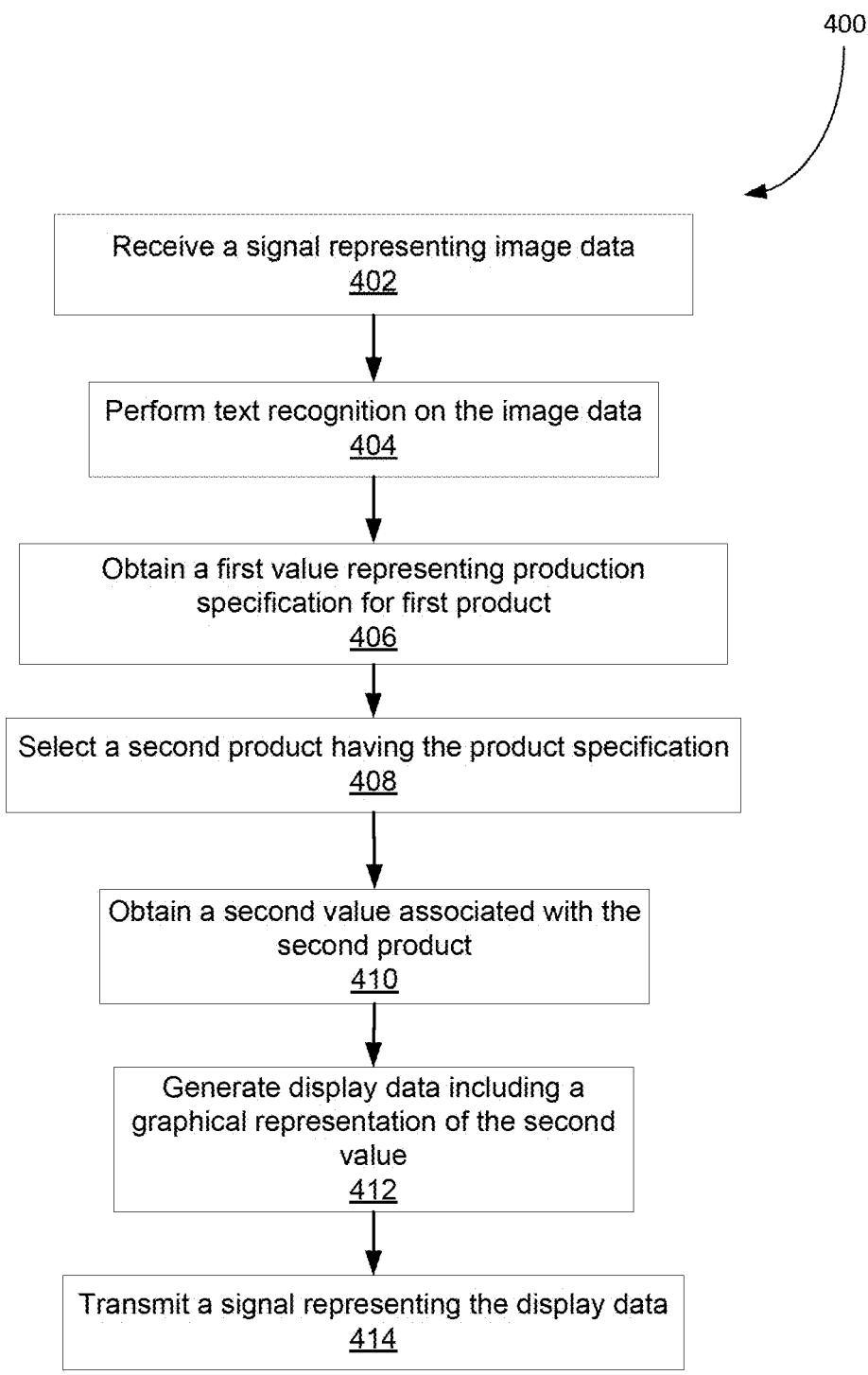
FIG. 4 shows, in flowchart form, an example method for obtaining an estimate of a value of a product.

Reference is made to FIG. 4, which shows, in flowchart form, an example method 400 for obtaining an estimate of a value associated with a product. Additionally or alternatively, the method 400 may be implemented as a subroutine of a process for automatically identifying products that are related to a user-selected product and comparing the identified products. The method 400 may be performed by a computing system, such as PVS 150, that is configured to obtain, evaluate, and present product information for one or more products. The product may, for example, be a policy, such as an insurance policy. The computing system may be communicably coupled to a plurality of client devices corresponding to product information requesting entities.

In operation 402, the computing system receives, from a client device, image data depicting at least one first document containing a product specification for a first product. For example, the computing system may receive, via the communications module, a signal that includes image data captured by the client device. The first document may be a policy document and/or a legal document. The first document may, for example, be an insurance policy document which identifies one or more terms, clauses, or conditions associated with an insurance policy. For example, the first document may reflect terms and conditions of a proposed policy, such as terms of a new automobile, health, life or housing insurance policy.

In some embodiments, the computing system may be configured to automatically recognize if the received image data depicts a certain type of document. An image processing module (such as image processing module 170 of FIG. 3B) of the computing system may implement one or more techniques for document image classification, in operation 402. The imaged document may be classified as a first type (e.g. insurance policy declaration) based on, for example, (local) image features, physical layout, logical structure, and/or textual features. For example, the received image may be processed by the image processing module using, for example, pattern recognition (e.g. template matching), document layout analysis, and/or other algorithms, to determine that the document that is captured in the image is of a first type.

The image data may, in some embodiments, be processed to facilitate further operations of the method 400. For example, since the image data of any one image may not reflect a complete document, the computing system may perform stitching based on multiple images in order to determine a more complete representation of the first document. In some instances, the computing system may parse the image data into a plurality of segments by automatically evaluating a geometric structure of the first document represented in the image data. For example, the computing system may identify whitespace having predefined characteristics in order to separate the image into sections or segments. Whitespace that is determined to represent carriage returns or indentations may be used to identify paragraphs of the document, and the image data may be separated into paragraphs.

In operation 404, text recognition is performed based on the received image data. For example, the image data or a portion thereof (such as a section or segment) may be analyzed to identify text contained therein. The image data may be processed by a parsing module (such as parsing module 172 of FIG. 3B) of the computing system to extract one or more text entry items from the imaged document. In some embodiments, when performing text recognition on the image data, the computing system may compare the image to one or more document templates from a templates database (such as PST database 180). The document templates may, for example, contain product specifications for various products. The computing system may determine whether there is a match between the imaged (first) document and one (or more) of the document templates from the templates database.

An example implementation of operation 404 is described. The received image data may first be passed to a field recognition engine, which determines regions and boundaries of the received image that correspond to the various data fields of an identified document type. The field recognition engine may, for example, perform a layout analysis by segmenting the document image into regions having homogeneous content and assigning a logical meaning (e.g. association with a data field) to each of the regions. Additionally or alternatively, the field recognition engine may employ a template matching technique to identify feature matches between the received image and document templates. Specifically, template matching can be used to identify regions of the received image that match data field labels and their neighboring regions in one or more document templates. By way of example, in some embodiments, the received image may be compared to one or more document templates, in order to identify matches of data fields. A data field in the received image of the document may be identified by detecting a match with a data field in one of the templates based on, for example, dimensions/shape of the data field, text or graphics label associated with the data field, and/or relative location of the data field on the imaged document.

Once the data field boundaries (and, accordingly, the corresponding data field regions) on the received image are identified, the image may be further processed by the optical character recognition (OCR) engine. The OCR engine is capable of converting images of typed, handwritten, or printed text into digital format, such as machine-encoded text. The OCR engine detects an image representation of a text entry item in a particular data field region and converts the image representation into text format. In this way, the text associated with the text entry items represented in the received image of the document can be extracted.

In some embodiments, the OCR engine may be used in identifying data fields on the received image of the document. In particular, the text content of a data entry item on the imaged document that is detected by the OCR engine may indicate or suggest the corresponding data field. For example, if the detected text reads "One Hundred and Fifty Dollars", the corresponding data field may be presumed to be an "Amount" field. In some embodiments, the OCR engine may even be configured to detect and convert data field labels into text, which would facilitate identifying the data fields. For example, the OCR engine may read "Insured Product:" and assign the associated data field as a "Coverage Type" field; similarly, the OCR engine may detect the phrase "In the Amount of:" in the received image and determine that the associated data field (e.g. a blank space immediately adjacent to the data label) corresponds to the "Amount" field. These techniques of "dynamically" identifying data fields by the OCR engine may be combined with static template matching methods in some instances. For example, the information obtained by the OCR engine may be used to verify, or weight a level of confidence, that the identification of data fields by means of static template matching/comparison is correct.

In some embodiments, the text obtained at operation 404 may be further processed. For example, in some instances, the stitching described above may not be performed on the image and may, instead, be performed on the text itself. That is, text obtained from multiple images may be analyzed in order to prepare a more fulsome version of the text of the first document. Additionally or alternatively, segmentation operations may be performed based on the analyzed text. By way of further example, where the document is a policy document such as a legal document, paragraph or clause numbers may be used to separate the document into sections or segments to facilitate the analysis operations described below.

The text that is recognized from the image data in operation 404 may be deficient. In some embodiments, the computing system may be configured to determine that the recognized text does not contain text associated with at least one data field that is known to be included in the first document. In response to determining that there is a deficiency in the recognized text, the computing system may generate display data for prompting a user of the client device to provide information relating to the missing one or more data fields. For example, the display data may be a graphical user interface including a fillable input form containing the at least one data field. Alternatively, the display data may be a graphical user interface including an application form having the missing data fields highlighted. The computing system may then transmit the display data to the client device in order to solicit additional information from the user(s) associated with the client device.

Control flow next proceeds to operation 406, where a first value representing the product specification for the first product is obtained based on the recognized text. That is, the text extracted from the image data is analyzed to identify the first value associated with the first product. The analyzed text may be the text identified in operation 404 or a further-processed version of such text, such as a document section or segment.

The first value may, for example, comprise one or more data fields and associated data entry items. By way of example, the first value may be a set of numerical values representing one or both of a deductible and a coverage limit. The analysis may be performed, for example, using template-based analysis techniques, machine-learning techniques, or both. For example, in some embodiments, the computing system may be configured to recognize a limited set of documents. That is, the computing system may only recognize known types of documents. By way of example, where the first document represents an insurance policy, the computing system may be configured to recognize only a limited set of insurance policy documents. The set may be limited, for example, since insurance policy documents often include standard language and each insurer may use only a limited set of insurance policy documents.

In some embodiments, a template-based analysis may be a multi-stage analysis. For example, the computing system may first analyze the extracted text or the image data to determine a type associated with the first document. The type may be determined, for example, based on word combinations, phrases, sentences, logos, etc. that are known to be contained in a certain type of document and that are not included in other known types of documents. Once identified, the type may be used to identify a template that is to be used to analyze the document, and the first value may be determined using the text and the identified template. For example, the computing system may recognize that only one known template includes the sentence "However, note that a decrease in your deductible, if available, will result in an increase in premiums." Upon identifying this sentence in the text, the computing system may select a template that is associated with the document type that includes the identified sentence and may use this template to identify the first value. For example, the template may indicate that the first value is located adjacent to the text "Your deductible will be".

The computing system may have access to classification data, which may be stored locally or remotely, which defines a plurality of templates. For example, each template may specify one or more words, word combinations, phrases, or sentences that are located near a parameter that is to be identified. For example, a template may specify a word combination that immediately precedes a parameter for a certain known type of document. For example, the template may specify that the parameter is located adjacent to the phrase "Your deductible will be". The computing system may then identify the first parameter by identifying the word combination.

A machine learning module may be used by the computing system in operation 406 to obtain the first value. The machine learning module may have been trained to identify the first value. For example, the machine learning module may have been trained with a set of documents and known parameters specified in such documents. The training set may have included a plurality of documents and a deductible (or other first value) contained in the text of such documents. Accordingly, in some implementations of operation 406, the computing system may pass at least a portion of the text through a machine learning module that has been trained to identify one or more parameters including the first value. The machine learning module may output the first value based on the text.

Figure 5:
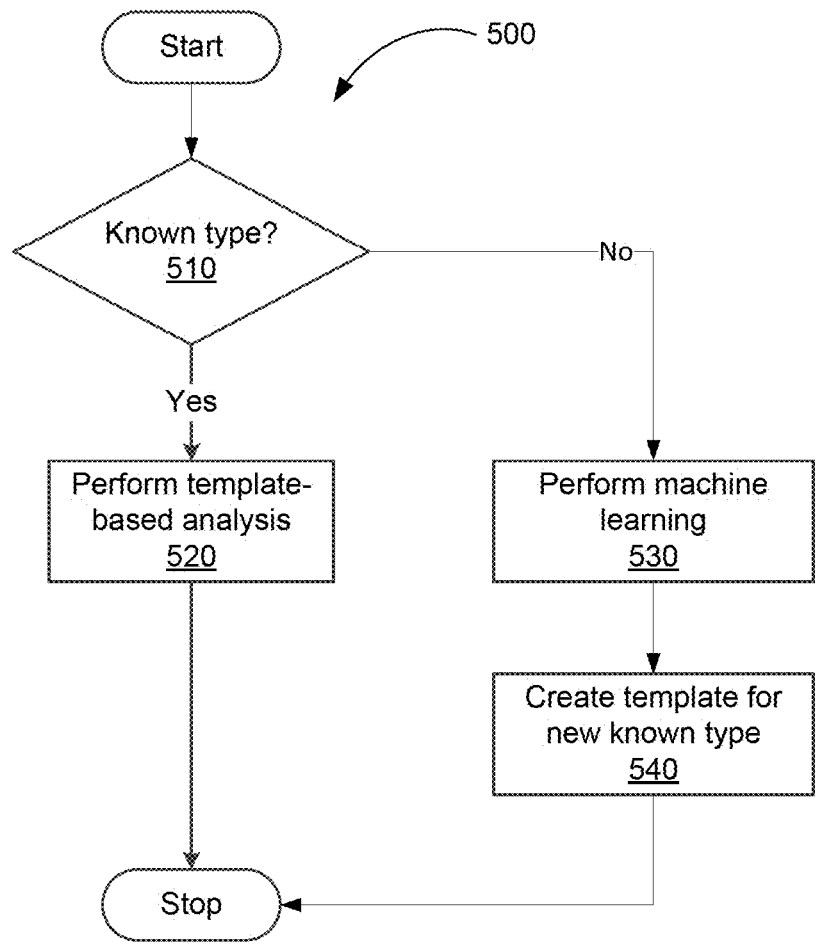
FIG. 5 shows, in flowchart form, an example method for analyzing text to identify product information.

FIG. 5 shows, in flowchart form, an example method 500 that may be performed by a computing system as a subroutine of operation 406 of FIG. 4.

In operation 510, the computing system determines whether the first document corresponds to a known type. This determination may be performed as described above. For example, word combinations, phrases, sentences, etc. in the text may be analyzed to determine whether they are associated with a known type of document.

If it is determined that the first document does not correspond to a known type, machine learning may be performed at operation 530 in the manner described above to identify the first parameter. In some instances, a template may also be created based on the text of the imaged document and stored (in operation 540) so that future instances of documents having a type that is the same as the first document can be analyzed using template-based techniques. For example, the template may be defined to specify a technique by which the first value may be located; for example, by defining nearby words or word combinations. Unique identification data associated with the document type may also be stored so that the computing system may subsequently identify other documents of the same type. For example, unique word combinations, phrases, sentences, etc. may be stored.

If, however, it is determined that the first document corresponds to a known type, template-based analysis techniques of the type described above may be performed at operation 520 to identify the first value.

Returning again to FIG. 4, after the first value is identified, control flow may proceed to operation 408. In operation 408, a second product having a product specification represented by the first value is selected (for example, from a products database). More specifically, the computing system may identify a second product, different from the first product, which has a particular specification. In some embodiments, the second product (e.g. a product offered by a competitor to the provider of the first product) may be selected based on determining that product specification for the second product satisfies a predetermined condition associated with a predetermined data field. In particular, the second product may be selected so that it has the same or similar properties/values with respect to one or more specific data fields. For example, if the first product has a certain property (e.g. coverage limit is $500), a product from a products database may be selected as the second product if it has the same (i.e. coverage limit is $500) property or falls within a predefined range (i.e. coverage limit is $480; coverage limit is within $50 of that for the first product).

The selection of the second product may be performed in real-time, in operation 408. The second product may be selected by, for example, querying a database of products to obtain, in real-time, a product having a specification that is represented by the first value. By selecting the second product and acquiring product data for the second product in real-time, the computing system may obtain product information that is relevant for making a purchase decision and present the information to customers in a timely manner. A customer will usually make a purchase decision, including a comparison of similar or related products, within a short span of time. A system that dynamically obtains product data in real-time can inform a purchase decision during the time span in which the customer's attention is focused on a specific product being considered for purchase. In particular, such a system may be capable of presenting product comparison data for products that are related or similar to a specific product that is considered by a customer for purchase.

In operation 410, the computing system obtains a second value associated with the selected second product. The second value may, for example, be a numerical value associated with the second product, such as price, term length, etc. In at least some embodiments, the second value corresponds to a data field or property for which the first product also has a value. That is, the second value may be selected only if a corresponding first value also exists. The computing system may be configured to retrieve the second value from a products database containing information pertaining to the second product. For example, the computing system may itself maintain, or have access to, one or more databases that contain product-related data for the second product. The computing system may query the databases to retrieve the second value associated with the second product. In some embodiments, rather than retrieving a predefined value for the second value, the computing system may compute the second value, using one or more parameters represented by the first value as inputs. For example, upon determining the provider (e.g. manufacturer, company) that offers the second product, the computing system may be configured to apply a suitable algorithm associated with said provider to compute the second value for the second product.

In operation 412, the computing system generates display data that includes a graphical representation of the second value. The display data may then be provided to the first client device. That is, a signal representing the display data may be transmitted, via the communications module of the computing system, to the first client device.

In at least some embodiments, the display data generated in operation 412 may include a representation of a comparison of the first product and the second product. More specifically, the second value associated with the second product (from operation 410) may be compared to a corresponding value for the first product. For example, where the second value is a deductible associated with a second insurance policy, a corresponding value (i.e. deductible) for a different first insurance policy product may be compared to the second value. The first and second products may be different versions/iterations of the same product, or products that are offered by different providers (e.g. competing insurance companies). For example, the first document may be a current policy document for a client and the second product may be a policy product that is offered by a competing provider.

The display data generated in operation 412 may indicate a difference in the corresponding values for the first and second products. For example, the computing system may be configured to identify differences between the corresponding values for the two products and to provide annotation data to highlight the differences.

In operation 414, a signal representing the display data is transmitted to the first client device. The display data may be transmitted to the first client device in real-time, such that relevant product information for facilitating a customer's purchase decision can be presented to the customer in a timely fashion. For example, the second value may be included as part of a graphical representation of product comparison data for the first and second products that is presented to the customer. The display data may be presented immediately after the customer captures image data depicting the first document containing a product specification for the first product.

More generally, the method 400 may be extended to provide product comparison data for three or more different products, based on capturing image data of a document containing a product specification for a first product. The image can be processed to obtain product specification for the first product, and a plurality of products having the same or similar production specification as the first product may be selected. The computing system may then generate product comparison data for the first and selected products, and transmit the data to a client device, for example, for presentation to a customer.

Figure 6:
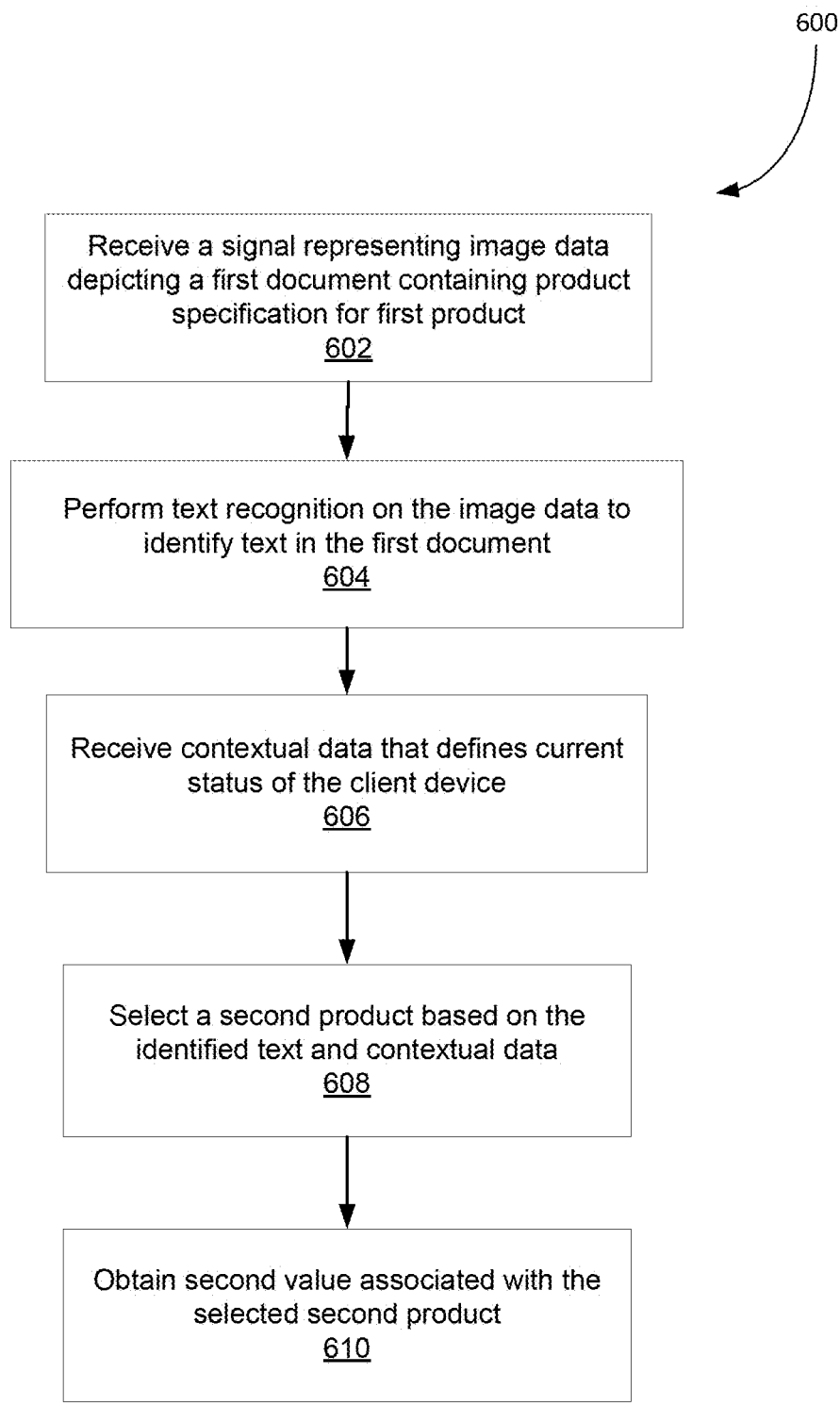
FIG. 6 shows, in flowchart form, an example method for obtaining an estimate of a value of a product.

Reference is now made to FIG. 6, which shows another example method 600 for obtaining an estimate of a value associated with a product. The method 600 may, in some instances, be implemented as a subroutine of a process for automatically identifying products that are related to a user-selected product and comparing the identified products. The method 600 may be performed by a computing system, such as PVS 150, that is configured to obtain, evaluate, and present product information for one or more products.

Operation 602, 604 and 610 of method 600 correspond to operations 402, 404 and 410 of method 400, respectively. In operation 602, the computing system receives, from a client device, image data depicting at least one first document containing a product specification for a first product. Text recognition is performed on the received image data to extract text from the at least one first document, in operation 604. According to method 600, the computing system may be configured to additionally receive contextual data from the client device, in operation 606. The contextual data may define a current status of the client device, and may comprise at least one of: geolocation data, temperature data, motion data, altitude data, and proximity data indicating proximity to one or more known devices. The contextual data received from the client device can be useful in verifying product specification for the first product or as a supplement to the text recognition process in operation 604. For example, where the image data is insufficient to enable accurate text recognition, contextual data from the client device may be used to supplement any text extracted from the imaged document, in order to obtain a comprehensive product specification for the first product.

In operation 608, the computing system selects a second product related to the first product, based on both the text extracted from the imaged document and the contextual data from the client device. A second value associated with the selected second product is then obtained, in operation 610. This second value may be transmitted to the client device, either in stand-alone format or as part of a graphical representation of a comparison between the first product and the second product.

By way of example, the computing system may receive, from a client device, geolocation data associated with the device. The geolocation data may allow for inferring, for example, an address of a home, office, etc. when the device is assumed or confirmed to be at those locations. This information may lead to further inference, such as neighbourhood, proximity to known landmarks, etc., about the user/device's specific location. In the context of an insurance policy product for a specific property, the textual data obtained from analyzing images of the policy may be supplemented (and/or confirmed) by information about the property that is directly derived or inferred from contextual data received from the client device.

In some embodiments, the computing system may receive historical contextual data from a client device. The client device may, for example, maintain a log of contextual data obtained at the client device (e.g. via sensors associated with the device). As an example, the client device may log the speed of an automobile when the device is located inside the automobile. This historical data may be used to supplement or confirm information about an automobile or product specifications for products relating to the automobile, such as an automobile insurance policy.

Figure 7:
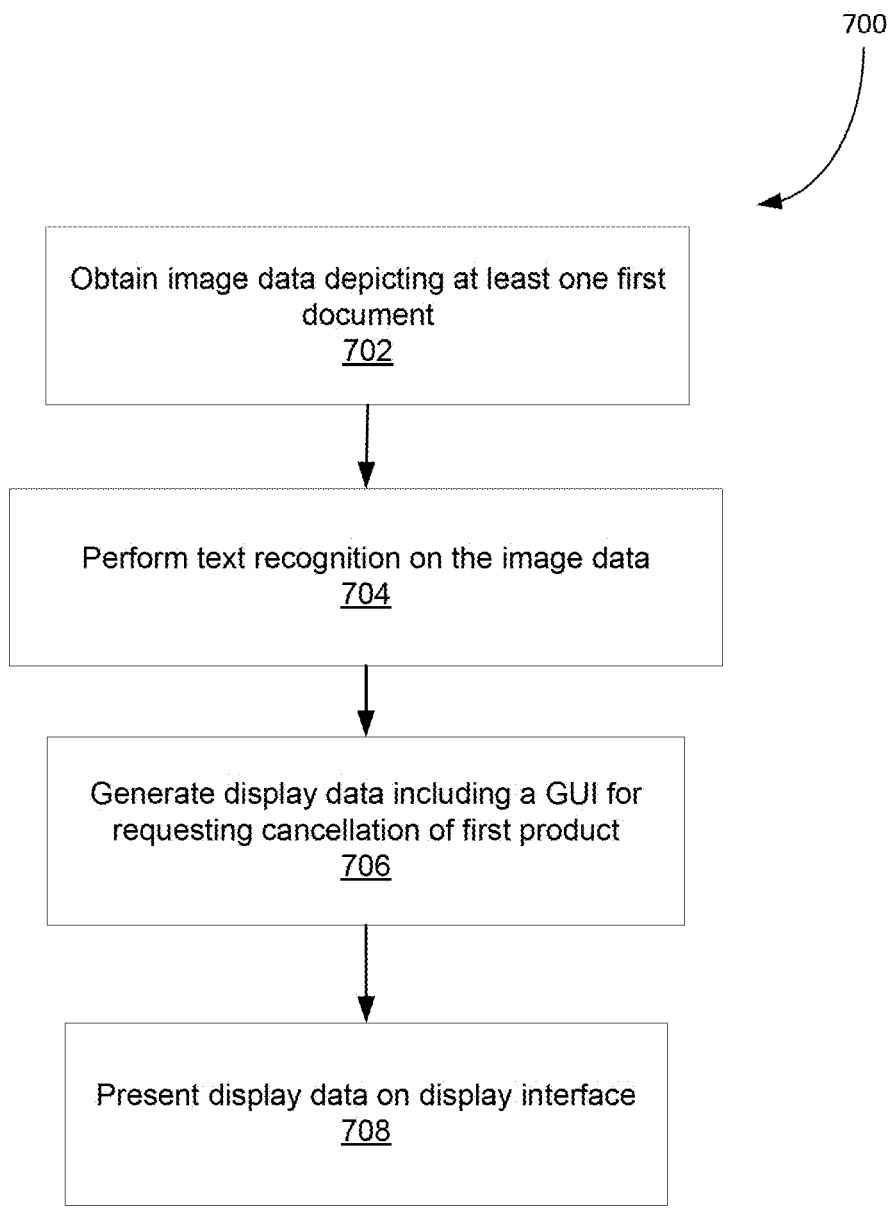
FIG. 7 shows, in flowchart form, an example method for automatically requesting cancellation of a product.

Reference is now made to FIG. 7, which shows, in flowchart form, an example method 700 for automatically requesting cancellation of a product. The method 700 may be implemented by an electronic device having an image-capture functionality. More specifically, an electronic device having a camera and a processor coupled to the camera may perform the method 700.

In operation 702, the electronic device obtains image data depicting at least one first document containing a product specification for a first product. The first product may, for example, be a policy (e.g. insurance policy) to which a user of the electronic device is subscribed to and/or has purchased. The electronic device performs text recognition on the image data, in operation 704, to extract text from the imaged first document.

Upon extracting the text, the electronic device may generate, in operation 706, display data including a graphical user interface for requesting cancellation of the first product. The graphical user interface is pre-populated with data based on the recognized text. In at least some embodiments, the extracted text may be analyzed to identify text in one or more predetermined data fields which may be required for generating a suitably formatted cancellation request. For example, the computing system may determine, for the first product, those data fields which are at least minimally required for a properly formatted cancellation request to the provider of the first product. Such fields may include name of provider, contact information for said provider, and identifying information for the customer. The identification of data fields, and subsequent extraction of data from the data fields, may be based on techniques such as template matching, machine learning, etc.

In operation 708, the display data is presented on a display interface of the electronic device. The electronic device may be configured to receive, via an input interface associated with the electronic device, a user input indicating confirmation of a cancellation request. In response to receiving the user input, the electronic device may transmit the request for cancellation to a first remote server (e.g. administrator server for a product provider). The server to which the cancellation request is transmitted may be identified based, for example, on text extracted from the imaged document and querying a database of known product providers and their requirements for properly formatted cancellation requests.

Figure 8:
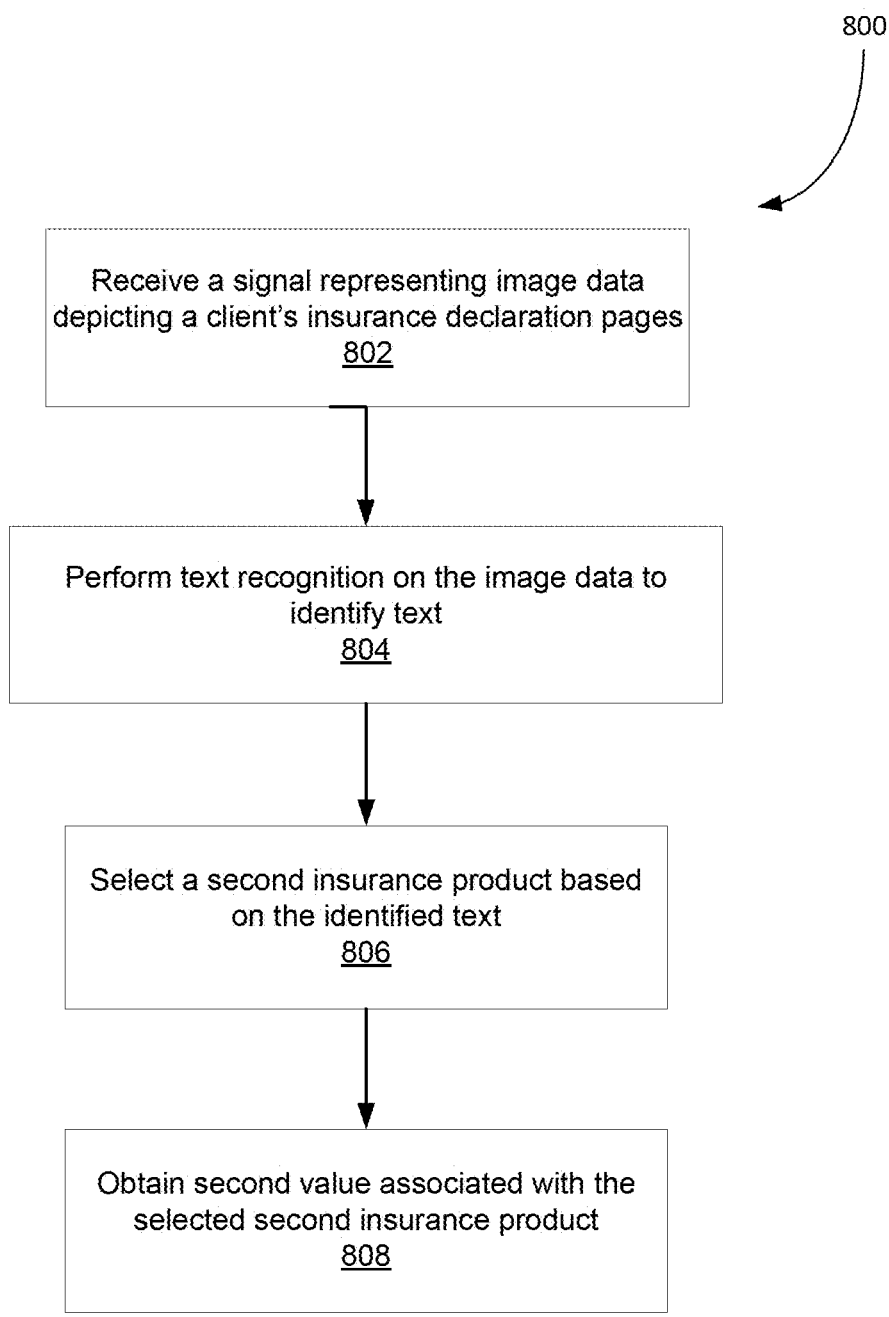
FIG. 8 shows, in flowchart form, an example method for obtaining a quote for an insurance product.

FIG. 8 shows, in flowchart form, an example method 800 for obtaining a quote for an insurance policy. The method 800 may be performed by a computing system implementing a product valuation system, such as PVS 150 of FIG. 1. For example, a server that is connected to one or more client devices and that has access to data relating to various different insurance policies may be configured to implement the method 800.

In operation 802, the computing system receives, from a first client device, a signal representing image data that depicts one or more of a client's insurance declaration pages associated with a first insurance product. In some embodiments, the image data may only depict certain parts of an insurance declaration page. For example, the image data may depict only those portions of documents that contain text. The text may, for example, correspond to predetermined data labels/fields and associated input data. The image data may, in some cases, depict portions that have specific locations on the documents. For example, the image data may capture portions corresponding to header and/or footer sections of the documents.

In operation 804, text recognition may be performed on the image data to identify text in the one or more insurance declaration pages. The computing system may itself perform text recognition/extraction from the image data, or transmit the image data to a text recognition service. In at least some embodiments, the images are converted to machine-encoded text (e.g. by OCR), and the text is extracted for further processing. The extracted text may include text that is associated with specific data fields for the first insurance product. For example, the text that is extracted may include the name of a policy provider, a deductible amount, coverage limits, asset value, and total premium.

In operation 806, the computing system selects a second insurance product based on the identified text. In some embodiments, the second insurance product that is selected may have similar (or same) coverage (e.g. deductible, coverage amount) as the first insurance product. That is, the computing system may use the textual data extracted from the received images to identify a different insurance product that has a similar (or same) coverage. The first and second insurance products may, for example, be offered by different providers. In particular, the second insurance product may be a product that is offered by a provider different from the provider for the first insurance product.

In operation 808, a second value associated with the selected second insurance product is obtained. This second value may, for example, be a premium associated with the selected insurance policy. Once the second value is obtained, it may be transmitted to the first client device for display on the device. For example, the second value may be included as part of comparison data that shows premiums associated with a plurality of insurance policies. The comparison data may include data relating to, at least, the first and second insurance products, and identify names of providers of the respective products. The display data that is transmitted to the first client device may include a graphical representation of the comparison data.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a communications module communicable with an external network;
a memory; and
a processor coupled to the communications module and the memory, the processor being configured to:
receive, from a first client device, a signal representing image data depicting at least one first document containing a product specification for a first product;
perform text recognition on the image data to identify text in the at least one first document;
determine at least one first value associated with the first product based on the recognized text;
identify a second product based on determining that product specification for the second product satisfies one or more predetermined criteria relating to the at least one first value;
determine at least one second value associated with the second product;
generate first display data including a graphical representation of the at least one second value; and
transmit, to the first client device via the communications module, a signal representing the first display data.

2. The computing system of claim 1, wherein the processor is further configured to receive, from the first client device, contextual data that defines a current status of the first client device, and wherein the at least one first value is determined based on the recognized text and the contextual data.

3. The computing system of claim 2, wherein the contextual data comprises at least one of:
geolocation data; temperature data; motion data; altitude data; or proximity data indicating proximity to one or more known devices.

4. The computing system of claim 1, wherein performing text recognition on the image data comprises:
comparing the image data depicting the at least one first document to one or more document templates from a first database, the one or more document templates containing product specifications for a first set of products; and
determining that there is a match between the at least one first document and a first one of the document templates from the first database.

5. The computing system of claim 1, wherein performing text recognition on the image data comprises applying optical character recognition on the image data.

6. The computing system of claim 1, wherein the processor is further configured to:
determine that the recognized text does not contain text associated with at least one first predetermined data field;
generate second display data for prompting a user of the first client device to provide information relating to the at least one first predetermined data field; and
transmit, to the first client device, the second display data.

7. The computing system of claim 6, wherein the second display data comprises a graphical user interface including a fillable input form containing the at least one first predetermined field.

8. The computing system of claim 6, wherein the second display data comprises a graphical user interface including an application form having the at least one first predetermined field highlighted.

9. The computing system of claim 1, wherein identifying the second product comprises determining that product specification for the second product satisfies a predefined condition associated with one or more predetermined data fields.

10. The computing system of claim 1, wherein generating the first display data comprises generating display data that includes a graphical representation of product comparison data for the first and second products.

11. A processor-implemented method comprising:
receiving, from a first client device, a signal representing image data depicting at least one first document containing a product specification for a first product;
performing text recognition on the image data to identify text in the at least one first document;
determining at least one first value associated with the first product based on the recognized text;
identifying a second product based on determining that product specification for the second product satisfies one or more predetermined criteria relating to the at least one first value;
determining at least one second value associated with the second product;
generating first display data including a graphical representation of the at least one second value; and
transmitting, to the first client device via a communications module, a signal representing the first display data.

12. The method of claim 11, further comprising receiving, from the first client device, contextual data that defines a current status of the first client device, and wherein the at least one first value is determined based on the recognized text and the contextual data.

13. The method of claim 12, wherein the contextual data comprises at least one of:
geolocation data; temperature data; motion data; altitude data; or proximity data indicating proximity to one or more known devices.

14. The method of claim 11, wherein performing text recognition on the image data comprises:
comparing the image data depicting the at least one first document to one or more document templates from a first database, the one or more document templates containing product specifications for a first set of products; and
determining that there is a match between the at least one first document and a first one of the document templates from the first database.

15. The method of claim 11, wherein performing text recognition on the image data comprises applying optical character recognition on the image data.

16. The method of claim 11, further comprising:
determining that the recognized text does not contain text associated with at least one first predetermined data field;
generating second display data for prompting a user of the first client device to provide information relating to the at least one first predetermined data field; and
transmitting, to the first client device, the second display data.

17. The method of claim 16, wherein the second display data comprises a graphical user interface including a fillable input form containing only the at least one first predetermined field.

18. The method of claim 16, wherein the second display data comprises a graphical user interface including an application form having the at least one first predetermined field highlighted.

19. The method of claim 11, wherein identifying the second product comprises determining that product specification for the second product satisfies a predefined condition associated with one or more predetermined data fields.

20. The method of claim 11, wherein generating the first display data comprises generating display data that includes a graphical representation of product comparison data for the first and second products.

* * * * *